United States Patent

Beauchemin

[11] Patent Number: 5,301,911
[45] Date of Patent: Apr. 12, 1994

[54] PORTABLE HANGING SYSTEM FOR ATTACHMENT TO VERTICAL OBJECTS

[76] Inventor: David G. Beauchemin, 1312 W. Bell, Houston, Tex. 77019

[21] Appl. No.: 954,388

[22] Filed: Sep. 30, 1992

[51] Int. Cl.⁵ .................................................. A47K 1/00
[52] U.S. Cl. .................................. 248/218.4; 24/170; 108/152
[58] Field of Search ............... 248/218.4, 219.1, 219.2, 248/231, 231.1; 211/107; 182/187, 92; 108/152; 24/170, 193, 270; 224/252, 253, 268

[56] References Cited

U.S. PATENT DOCUMENTS

| | | | |
|---|---|---|---|
| 2,904,866 | 9/1959 | Carter | 24/170 |
| 3,022,898 | 2/1962 | Loeb | 248/231 X |
| 3,030,160 | 4/1962 | Tandy | 182/187 X |
| 4,008,937 | 2/1977 | Filippi | 24/270 X |
| 4,409,907 | 10/1983 | Norton | 248/231 X |
| 4,674,597 | 6/1987 | Humphrey | 248/231 X |
| 4,744,537 | 5/1988 | Buckley | 211/107 X |
| 4,955,518 | 9/1990 | Parsons et al. | 224/253 X |
| 5,014,892 | 5/1991 | Copeland | 224/253 X |
| 5,044,109 | 9/1991 | Fast | 224/252 X |
| 5,156,096 | 10/1992 | Lamprey | 108/152 |

Primary Examiner—Ramon O. Ramirez
Attorney, Agent, or Firm—Kenneth A. Roddy

[57] ABSTRACT

A portable hanging system includes a non-elastic flexible fabric belt of sufficient length to encircle generally vertical objects of varying diameters, such as a tree trunk, an adjustable lever-type buckle on the belt to releasably grip and apply tension in the encircled portion of the belt and firmly secure the belt in the encircled condition, and a plurality of generally rectangular bracket members. Each bracket has a flat tang portion which is slidably received between the outer surface of the generally vertical object and the inner surface of the belt and is held tightly against the generally vertical object when the belt is firmly tensioned. The brackets have an outer surface which lies on the outer surface of the belt and the outer surfaces have a variety of shapes configured to receive various articles to be suspended and supported therefrom. The outer surface of the brackets include eyelet, hook, socket, and shelf supporting configurations. All the components can be stored in a compact configuration and are easily transported. The hanging system is particularly useful for campers and backpackers.

12 Claims, 3 Drawing Sheets

PORTABLE HANGING SYSTEM FOR ATTACHMENT TO VERTICAL OBJECTS

BACKGROUND OF THE INVENTION

1. Field of the Invention

This invention relates generally to hanging devices, and more particularly to a portable hanging system which includes a non-elastic flexible fabric belt that encircles generally vertical objects of varying diameters, such as a tree trunk, an adjustable lever-type buckle on the belt to releasably grip and firmly secure the belt in the encircled condition, and a plurality of generally rectangular bracket members which are held firmly in place by the belt and have outer surfaces configured to receive various articles to be suspended and supported therefrom.

2. Brief Description of the Prior Art

A common problem when camping, backpacking, or picnicing out of doors, is that there is no convenient means of hanging or storing gear and the variety of loose articles associated with such endeavors. It is often desirable to hang lanterns for optimum light, and place some articles above the ground to allow them to dry or to prevent animals from gaining access to them.

Usually, if a picnic table is available, the table top serves as the storage area and is quickly cluttered with various items. Some campers will drape wet clothing over their tent to dry, and others will tie a clothesline between two trees. Many campers will drive a nail into a tree to hang articles, such as lanterns and water bags which causes harm to the tree and is a safety hazard to other campers unaware of the nail sticking out of the tree.

Thus, a longfelt need exists for a portable hanging system that can be carried in a compact stored condition and quickly and easily installed on a tree trunk or other vertical object which will allow a wide variety of articles to be suspended and supported above the ground.

There are several patents which disclose various hanging devices which encircle a vertical member and support other objects.

Fischett, U.S. Pat. No. 3,009,612 discloses a fishing harness which is strapped around the waist of the user and has a socket or cup for bracing a fishing rod to relieve strain while fishing.

Cucullo, U.S. Pat. No. 3,164,343 discloses a gravestone flower support which utilizes a metal band having its longitudinal edges bent over to form longitudinal beads along the top and bottom longitudinal edges and provide a guide for an adjacent band portion, likewise having its longitudinal edges bent over to form complementary beads. A toothed portion of the metal band interlocks with the beaded portion such that they cannot be released from each other. A metal wreath support and a metal conical flower receptacle have U-shaped bends at the rear portions for supporting them on the metal band.

Buckley, U.S. Pat. No. 4,744,537 discloses a sling and bracket type hanging device which can be mounted on a tree. The device utilizes a vertical bracket formed of angle iron which is secured vertically to a tree trunk by an elastic band which encircles the trunk at the lower end of the bracket. An elongate horizontal support affixed to the medial portion of the vertical angle bracket extends horizontally outward therefrom and is supported by a rope sling which is looped around the tree trunk above the elastic band and its attached at its free end to the medial portion of the horizontal support arm.

The present invention is distinguished over the prior art in general, and these patents in particular by a portable hanging system which includes a non-elastic flexible fabric belt of sufficient length to encircle generally vertical objects of varying diameters, such as a tree trunk, an adjustable lever-type buckle on the belt to releasably grip and apply tension in the encircled portion of the belt and firmly secure the belt in the encircled condition, and a plurality of generally rectangular bracket members. Each bracket has a flat tang portion which is slidably received between the outer surface of the generally vertical object and the inner surface of the belt and is held tightly against the generally vertical object when the belt is firmly tensioned. The brackets have an outer surface which lies on the outer surface of the belt and the outer surfaces have a variety of shapes configured to receive various articles to be suspended and supported therefrom. The outer surface of the brackets include eyelet, hook, socket, and shelf supporting configurations. All the components can be stored in a compact configuration and are easily transported. The hanging system is particularly useful for campers and backpackers.

SUMMARY OF THE INVENTION

It is therefore an object of the present invention to provide a portable hanging system which can be easily and quickly attached to a vertical object such as a tree trunk.

It is another object of this invention to provide a portable hanging system which has a variety of bracket members which can be firmly connected to a vertical object and have outer surfaces configured to receive various articles to be suspended and supported therefrom.

Another object of this invention is to provide a lightweight portable hanging system which can be stored in a small compact configuration and is transported.

Another object of this invention is to provide a portable hanging system having a non-elastic flexible fabric belt which encircles generally vertical objects of varying diameters, an adjustable buckle on the belt to releasably grip and apply tension in the encircled portion of the belt and firmly secure the belt in the encircled condition which will not damage the surface of the object on which it is attached.

Another object of this invention is to provide a portable hanging system which is particularly useful for campers and backpackers for hanging a wide variety of camping gear and provisions above the ground and is easily carried in a backpack.

A further object of this invention is to provide a portable hanging system which will eliminate the need to drive nails into trees and other vertical objects for hanging various articles.

A still further object of this invention is to provide a portable hanging system which is simple in construction, economical to manufacture, and is rugged and reliable in use.

Other objects of the invention will become apparent from time to time throughout the specification and claims as hereinafter related.

The above noted objects and other objects of the invention are accomplished by a portable hanging system which includes a non-elastic flexible fabric belt of sufficient length to encircle generally vertical objects of varying diameters, such as a tree trunk, an adjustable lever-type buckle on the belt to releasably grip and apply tension in the encircled portion of the belt and firmly secure the belt in the encircled condition, and a plurality of generally rectangular bracket members. Each bracket has a flat tang portion which is slidably received between the outer surface of the generally vertical object and the inner surface of the belt and is held tightly against the generally vertical object when the belt is firmly tensioned. The brackets have an outer surface which lies on the outer surface of the belt and the outer surfaces have a variety of shapes configured to receive various articles to be suspended and supported therefrom. The outer surface of the brackets include eyelet, hook, socket, and shelf supporting configurations. All the components can be stored in a compact configuration and are easily transported. The hanging system is particularly useful for campers and backpackers.

DESCRIPTION OF THE PREFERRED EMBODIMENT

Figure 1:
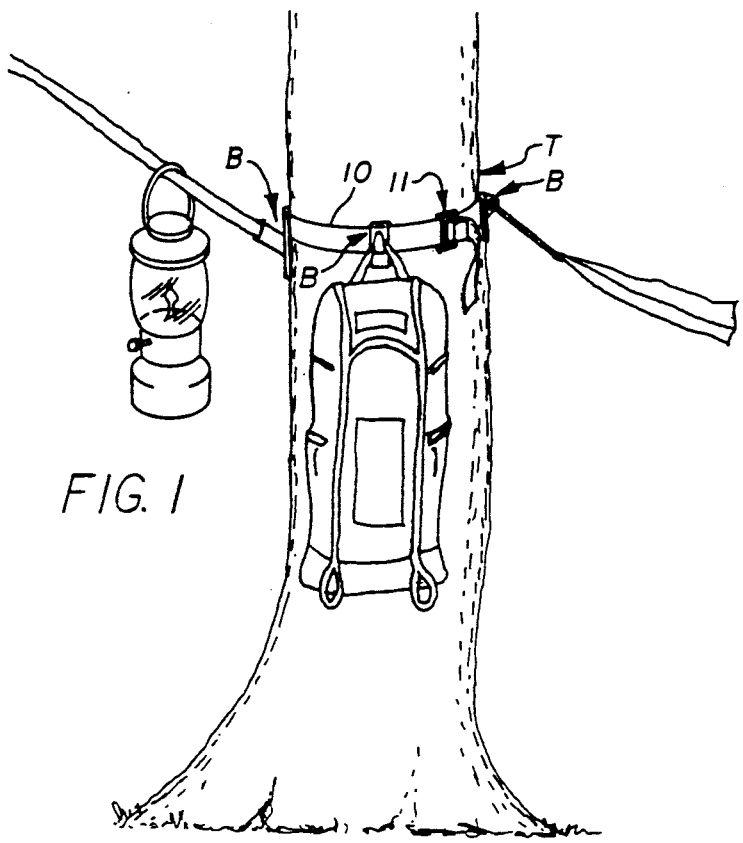
FIG. 1 is a perspective view of the hanging system in accordance with the present invention shown installed on the trunk of a tree and supporting various articles from the bracket members.

In the following discussion, the hanging system will be described as being installed on the trunk of a tree, but it should be understood that it can be installed on other types of vertical objects. Referring now to FIG. 1, the present hanging system 10 supports various articles from a tree trunk T or other vertical object and is particularly useful for campers and hikers. A substantially non-elastic flexible fabric belt 10, preferably made of webbing material encircles the tree trunk T or other vertical object and is buckled tightly around the trunk by a cam-type buckle 11.

A plurality of bracket members B (described hereinafter) are provided which are configured to be secured firmly against the tree trunk T by the belt and have an outer surface adapted to receive and support various articles above the ground such as; backpacks, hiking boots, hammocks, lanterns, clotheslines, bags of food, water jugs, etc.

Figure 2:
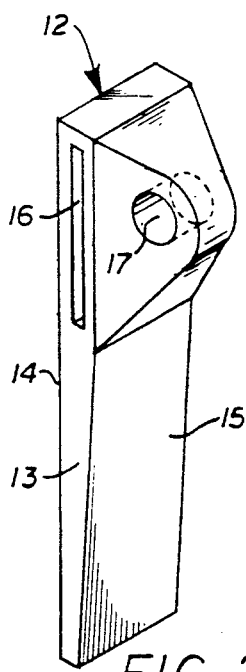
FIG. 2 is an isometric view of a bracket member of the hanging system having an eyelet connector portion.

FIG. 2 shows an embodiment of a bracket member 12 configured to receive a cord or rope for securing the end of a hammock, clothesline, etc. The bracket 12 is a generally rectangular member having a vertical portion 13 with a flat back surface 14 and a front surface 15. A slot 16 extends transversly through the vertical portion 13 parallel to the flat back surface 14 to slidably receive the free end of the belt. In the embodiment of FIG. 2, the bracket is threaded onto the belt prior to attaching the belt to the tree trunk. The upper portion of the front surface 15 of the bracket 12 extends outwardly and has a hole extending transversly therethrough to define an eyelet 17 through which rope or cord may be passed and tied thereto.

Figure 3:
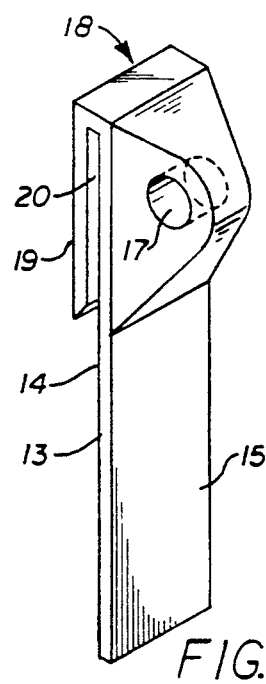
FIG. 3 is an isometric view of another bracket member of the hanging system having an eyelet connector portion.

FIG. 3 shows another embodiment of a bracket member 18 configured to receive a cord or rope for securing the end of a hammock, clothesline, etc., wherein the bracket can be placed on the belt after the belt has been placed around the tree trunk and prior to the buckle being fastened. The bracket 18 is a generally rectangular member having a vertical portion 13 with a flat back surface 14 and a front surface 15. The upper portion of the back surface 14 extends outwardly a short distance and then vertically downward a distance to form a flat rectangular tang portion 19 spaced parallel to the flat back surface 14 and define a slot 20 open at the bottom end. The slot is of sufficient width to slidably receive the belt 10. In the embodiment of FIG. 3, the bracket is installed onto the belt after attaching the belt to the tree trunk but prior to fastening the buckle by sliding the tang portion 19 over the side edge of the belt to be captured between the inner surface of the belt and the exterior of the tree trunk. The upper portion of the front surface 15 of the bracket 18 extends outwardly and has a hole extending transversly therethrough to define an eyelet 17 through which rope or cord may be passed and tied thereto.

Figure 4:
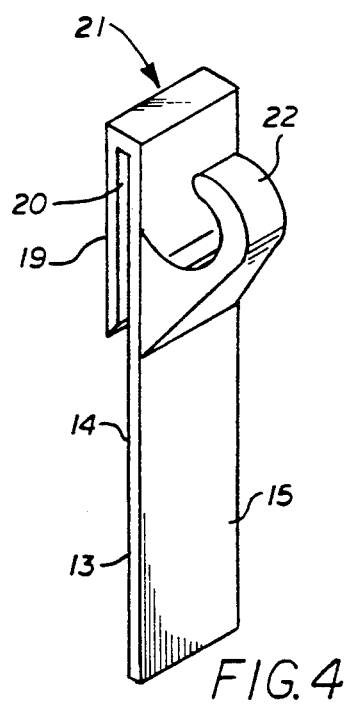
FIG. 4 is an isometric view of a bracket member of the hanging system having a hook connector portion.

FIG. 4 shows another bracket member 21 having a hook portion to receive and support various articles placed on the hook. The bracket 21 is a generally rectangular member having a vertical portion 13 with a flat back surface 14 and a front surface 15. The upper portion of the back surface 14 extends outwardly a short distance and then vertically downward a distance to form a flat rectangular tang portion 19 spaced parallel to the flat back surface 14 and define a slot 20 open at the bottom end. The slot 20 is of sufficient width to slidably receive the belt 10 and the bracket is installed by sliding the tang portion 19 over the side edge of the belt after the belt is installed but prior to fastening the buckle, as described above. The upper portion of the front surface 15 of the bracket 21 extends outwardly a distance and then curves upwardly to define a hook 22. Articles such as; backpacks, hiking boots, hammocks, lanterns, bags of food, water jugs, etc., may be hung from the hook 22.

Figure 5:
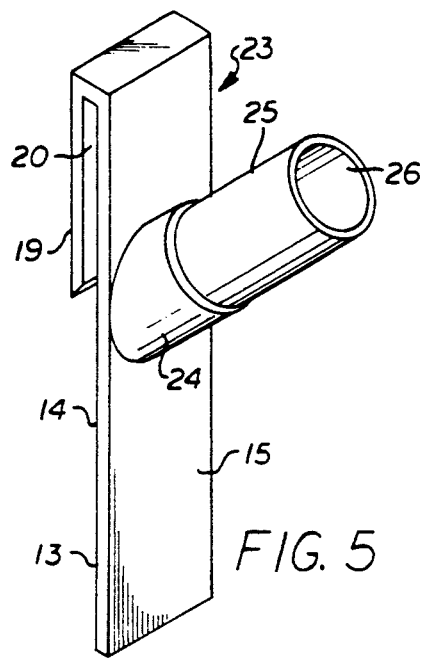
FIG. 5 is an isometric view of a bracket member of the hanging system having a socket connector portion.

FIG. 5 shows another bracket member 23 having a socket portion whereby a small tree limb or rod-like object may be inserted into the socket and then various articles can be received and supported by the limb or rod-like object. The bracket 23 is a generally rectangular member having a vertical portion 13 with a flat back surface 14 and a front surface 15. The upper portion of the back surface 14 extends outwardly a short distance and then vertically downward a distance to form a flat rectangular tang portion 19 spaced parallel to the flat back surface 14 and define a slot 20 open at the bottom end. The front surface 15 has a first tubular socket portion 24 which extends a short distance outwardly and upwardly at an angle to the front surface. A second tubular socket member 25 is slidably received within the interior of the tubular socket portion 24. The interior 26 of the tubular socket member 25 is sized to receive a tree limb, rod, broomstick, or similar rod-like object. When not in use, the tubular socket member 25 is removed from the socket portion 24 for compact storage.

Figure 6:
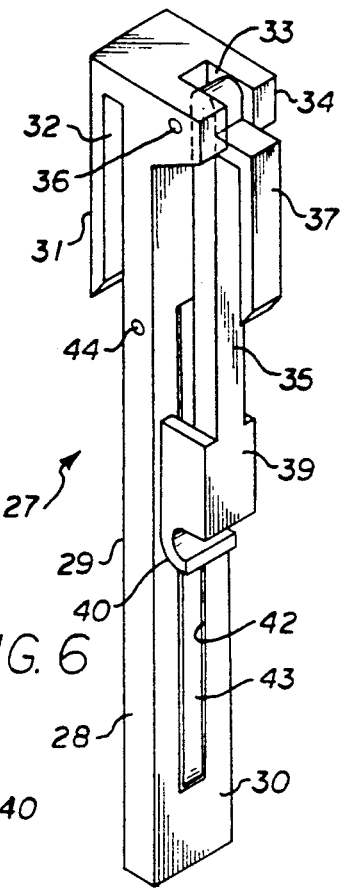
FIG. 6 is an isometric view of a bracket member of the hanging system having a shelf support portion shown in a folded position.
Figure 7:
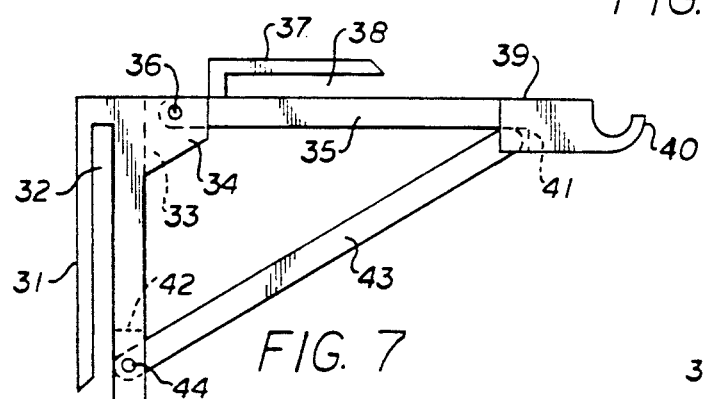
FIG. 7 is an isometric view of a bracket member of the hanging system having a shelf support portion shown in an unfolded position.
Figure 8:
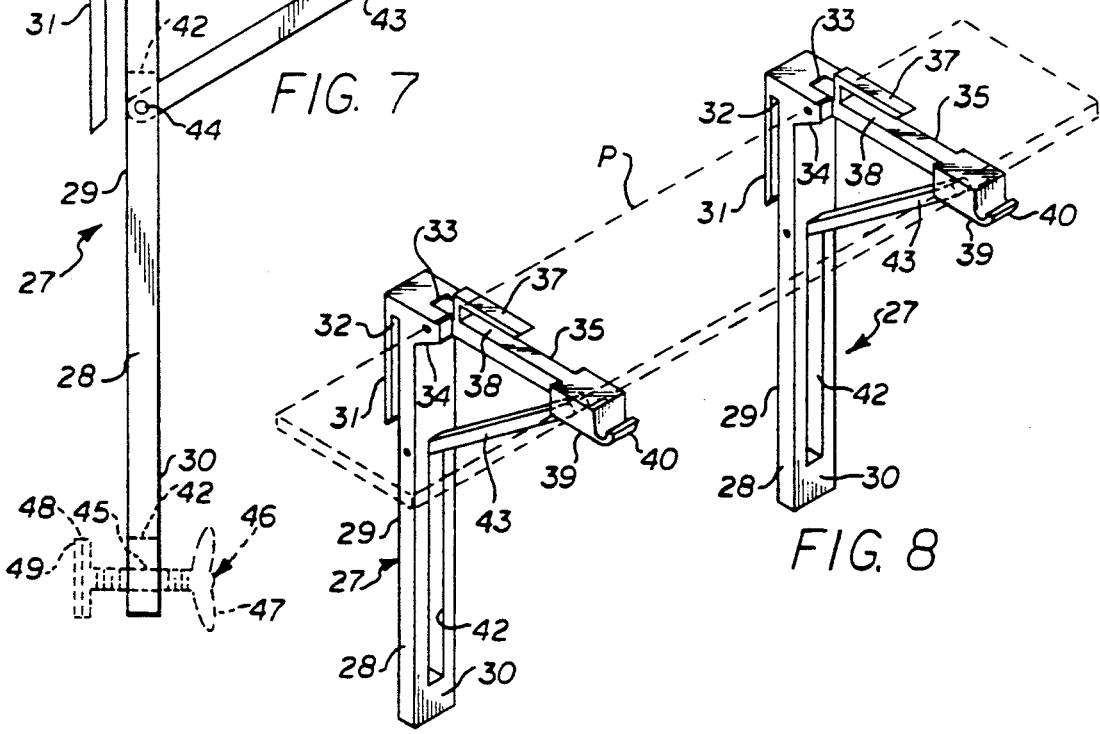
FIG. 8 is an isometric view of a pair of the bracket members of FIG. 6 shown supporting a shelf.

FIGS. 6, 7, and 8 show still another bracket member 27 which is movable between a folded and unfolded position and configured to receive a flat board or plank which serves as a shelf. The bracket 27 is a generally rectangular member having a vertical portion 28 with a flat back surface 29 and a front surface 30. The upper portion of the back surface 29 extends outwardly a short distance and then vertically downward a distance to form a flat rectangular tang portion 31 spaced parallel to the flat back surface 29 and define a slot 32 open at the bottom end.

The front surface 30 has a top portion which extends outwardly from the front surface and has a slot 33 formed therein to define a yoke 34. A generally rectangular support arm 35 is rotatably pinned within the slot 33 of the yoke 34 at one end by a pivot pin 36. The upper portion of the support arm 35 has a top extension which extends perpendicularly outwardly a short distance and then a distance parallel to the support arm to form a flat rectangular tang portion 37 spaced parallel to the outer or top surface of the support arm and define a slot 38 open at one end. The outer end of the support arm 35 has an enlarged rectangular portion 39 which extends outwardly a distance and then curves upwardly to define a hook 40. A slotted recess 41 is formed on the underside of the rectangular portion 39 (FIG. 7).

The vertical portion 28 of the bracket 27 has a central elongate vertical slot 42 formed therethrough. A generally rectangular brace member 43 is rotatably pinned at one end within the upper end of the slot 42 by a pivot pin 44. The free end of the brace member 43 is sized to be received within the slotted recess 41 on the underside of the support arm rectangular portion 39.

The bracket 27 is shown in FIG. 6 in a folded position. In the folded position, the brace member 43 is received within the vertical slot 42 and resides flush with the front surface 30 of the vertical portion 28 and the support arm 35 extends vertically downward parallel to the vertical portion. As shown in FIGS. 7 and 8, in the infolded position, the support arm 35 is pivoted to a raised position perpendicular to the vertical portion 28 and the brace 43 is pivoted angularly upward from the vertical portion and placed in the slotted recess 41 in the rectangular portion 39 of the support arm 35 to brace the support arm in the perpendicular position. In the unfolded position, the support arm 35 and slot 38 defined by the tang portion 37 is in a generally horizontal orientation. A thin flat board or plank P is then inserted into the slot 38 to serve as a shelf.

It should be understood that in some instances a single bracket 27 may be used, but for added support, a pair of brackets 27 may be secured against the tree trunk in laterally spaced relation as seen in FIG. 8. In this arrangement, the board or plank P is supported between the laterally spaced support arms 35. The shelf arrangement seen in FIG. 8 may be used to support kitchen or toilet articles and towels and other articles may be supported on the hooks 40 at the outer ends of the support arms 35.

As indicated in dotted line in FIG. 7, the bracket 27 may be provided with a threaded aperture 45 which threadedly receives an adjustment screw 46. The adjustment screw 46 has a wing nut 47 at its outer end and a flat flange or disk 48 and its inner end which bears on the outer surface of the tree trunk or other vertical object. A pad 49 of resilient material may be secured to the outer surface of the disk 48. The adjustment screw 46 allows the user to adjust the vertical angle of the bracket 27 relative to the tree trunk to level the board or plank P.

Figure 9:
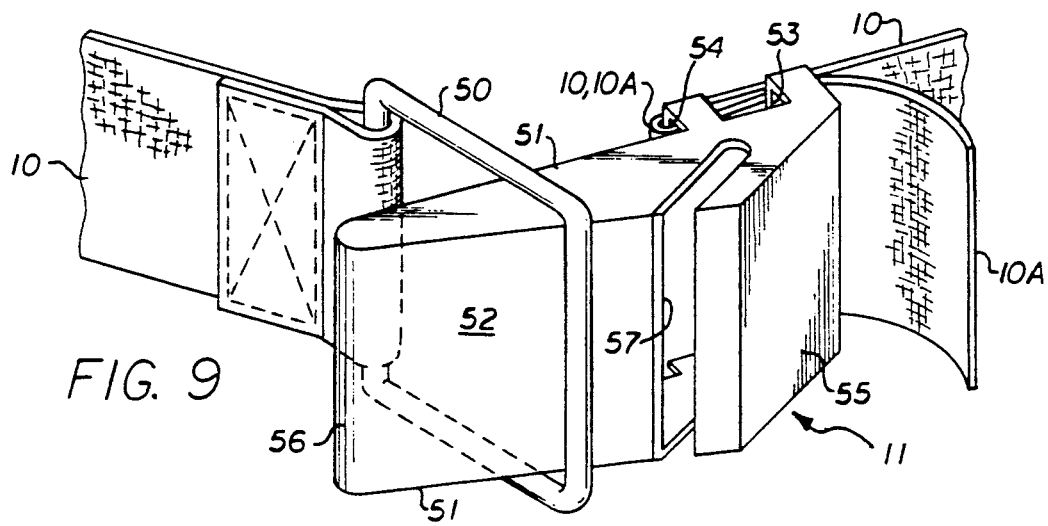
FIG. 9 is a perspective view of a portion of the belt and cam buckle arrangement of the hanging system in an unfastened position.
Figure 10:
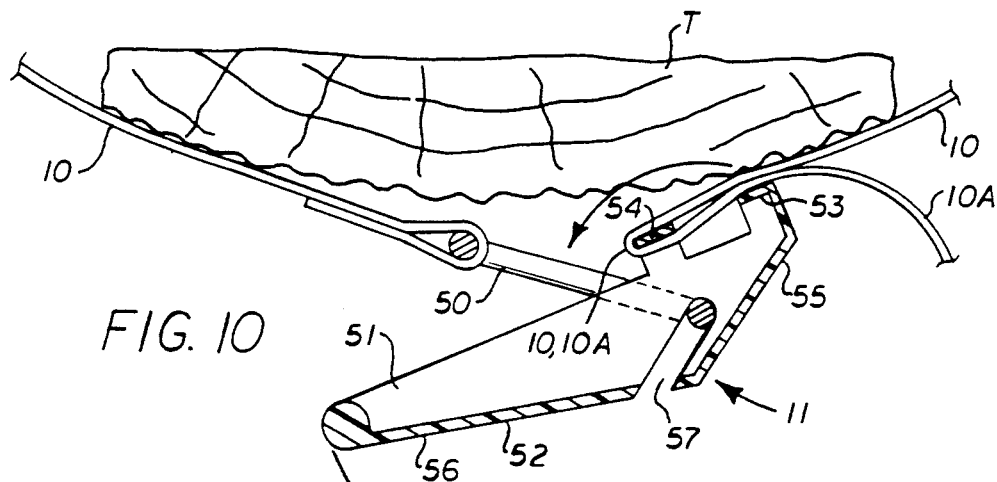
FIG. 10 is a top plan view in cross section of a portion of the belt and cam buckle arrangement showing the buckle being moved to the fastened position.
Figure 11:
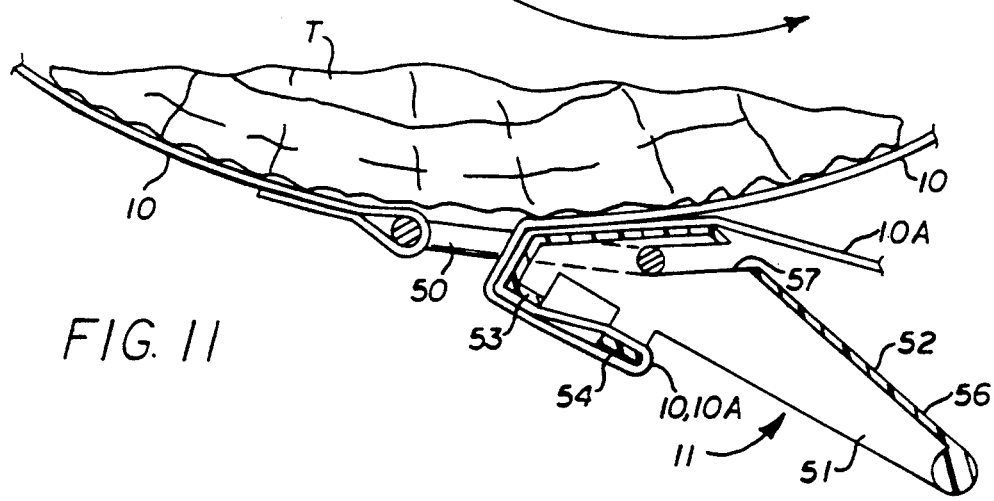
FIG. 11 is a top plan view in cross section of a portion of the belt and cam buckle arrangement showing the buckle in the fastened position.

Referring now to FIGS. 9, 10, and 11, the belt and cam buckle arrangement will be described. The flexible belt 10 is formed of substantially non-elastic flexible fabric material, such as nylon webbing. A loop ring 50 formed of rigid plastic or metal material is secured onto one end of the belt 10 by looping the belt around the ring 50 and stitching it onto itself. The other end of the belt 10 is connected to a cam buckle member 11 formed of rigid material, such as plastic or metal. The preferred buckle member is of unitary construction and has a pair of parallel side walls 51 and a top wall 52 to form a generally U-shaped cross section slightly wider than the belt width. The back end of the buckle 11 has a short bottom wall 53 and a parallel spaced rail member 54 extending transversly between the side walls 51. The top wall 52 extends angularly upward a distance from the open rear end forming a flat surface 55 and then angles downwardly a longer distance to the forward end defining a lever portion 56. A slot 57 extends transversly across the lever portion 56 near its intersection with the flat surface 55 and angularly inward a distance along the side walls 51.

As best seen in FIG. 10, the free end 10A of the belt 10 is passed beneath the bottom of the buckle 11 and then passed over the rail 54 and back beneath the bottom wall 53. The belt 10 can then be placed around the tree trunk T and the loop ring 50 and buckle 11 placed in close proximity to one another as seen in FIG. 9. The loop ring 50 is then placed into the slot 57. While holding the buckle and loop ring together in one hand, the free end 10A of the belt 10 may be pulled to remove any slack in the belt portion encircling the trunk. At this point, the desired types of brackets are selected and placed onto the belt 10 with their tang portions captured between the interior of the belt and the exterior of the tree trunk.

Once the brackets are positioned as desired, the lever portion 56 of the buckle 11 is cammed over as indicated by arrows in FIG. 10. As the lever portion 56 is pulled outward from the direction of the trunk T, the buckle 11 will pivot about the axis of the portion of the loop ring in the slot 57 causing the flat surface 55 to move toward the trunk. As this takes place, the two plys of the belt 10,10A beneath the bottom wall 53 at the rear of the buckle will be pressed together. Further movement of the lever portion 56 causes the rear portion of the buckle to roll over, acting as a cam, firmly gripping the two plys 10,10A of the belt together and drawing the looped end of the belt and loop ring together until the flat surface 55 is pressed against the trunk (FIG. 11). The angle of the slot 57 in the side walls 57 is such that when the buckle 11 is cammed over, the belt 10 is firmly tensioned around the trunk and the pulling force on the loop ring 50 at the bottom of the slot 57 is below the axis of opposed pulling force of the looped portion of the belt 10 to prevent the buckle from rolling back over the axis of the loop ring.

After the belt is firmly tensioned, the brackets are firmly secured to the tree trunk or other vertical object and various articles can then be suspended and supported from the brackets, as shown in FIG. 1. It should be noted, that with the present invention, only the webbing belt is in direct contact with the exterior of the tree trunk or other vertical object, thus preventing damage to the surface. When it is desired to remove the belt and brackets, the lever portion of the buckle is pivoted back over in the opposite direction releasing the belt tension.

When not in use, the belt 10 and buckle 11 may be folded into a compact generally rectangular storage configuration and may be secured in the folded condition by a fabric hook and loop fastener. In the preferred embodiment, the length of the bracket members is approximately the same as the length of the rectangular configuration of the folded belt and buckle in their compact storage condition such that the all of the components may be stored in a small space, such as in a backpack, and easily transported.

While this invention has been described fully and completely with special emphasis upon a preferred embodiment, it should be understood that within the scope of the appended claims the invention may be practiced otherwise than as specifically described herein.

I claim:

1. A portable hanging system for supporting various articles from generally vertical objects of varying diameters comprising;

a non-elastic flexible fabric belt having and inner and outer surface and of sufficient length to encircle an exterior surface of generally vertical objects of varying diameters, a rigid loop member secured on one end of said belt, an adjustable lever-type cam buckle member installed on said belt having a pivotal lever portion configured to grip said belt and to releasably engage said loop member and draw said loop member and the gripped portion of said belt toward one another to apply tension in the encircled portion of said belt and bias said lever portion in a fastened condition to firmly secure said belt in the encircled condition, a plurality of bracket members each having a generally vertical flat tang portion slidably and removably received between the exterior surface of the generally vertical object and the inner surface of said belt by vertical insertion or removal when said belt is in an encircled unfastened condition and each said bracket member having an outer surface disposed on the outer surface of said belt when installed thereon, and connector means integrally formed on the outer surface of each said bracket member for securement of various articles to be suspended and supported from said bracket member, each said bracket member tang portion being tightly gripped and rigidly secured between the exterior surface of the generally vertical object and the inner surface of said belt to prevent relative movement therebetween when said belt is firmly secured in the encircled and fastened condition, and the article secured to said bracket member connector means being suspended and supported by said bracket member.

2. The portable hanging system according to claim 1 in which said adjustable lever-type cam buckle member is configured such that in the engaged and fastened condition at least one ply of the belt material is disposed between said buckle and the exterior surface of the generally vertical object and no portion of said buckle is in direct contact with the exterior surface of the generally vertical object to prevent damage to the exterior surface of the generally vertical object by said buckle.

3. The portable hanging system according to claim 1 which said connector means is an upwardly curved hook element integrally formed on said bracket outer surface.

4. The portable hanging system according to claim 1 in which said connector means is a transverse circular ring portion integrally formed on said bracket outer surface defining an eyelet.

5. The portable hanging system according to claim 1 in which there are at least one pair of identical said bracket members, said connector means on the outer surface of each said pair of bracket members comprises a first horizontal shelf supporting element on an upper end of said bracket outer surface to extend horizontally outwardly therefrom which is configured to suspend and support a generally rectangular shelf, and second connector means at the outer end of each said horizontal shelf supporting element for securement of various other articles to be suspended and supported.

6. A portable hanging system for supporting various articles from generally vertical objects of varying diameters comprising:

a non-elastic flexible fabric belt having and inner and outer surface and of sufficient length to encircle an exterior surface of generally vertical objects of varying diameters, adjustable fastener means on said belt to releasably grip and apply tension in the encircled portion of said belt and firmly secure said belt in the encircled condition, and a plurality of generally rectangular bracket members each having a generally vertical flat tang portion slidably received between the exterior surface of the generally vertical object and the inner surface of said belt and each said bracket member having a vertical outer surface parallel to and spaced from said tang portion disposed on the outer surface of said belt to define a slot to receive said fabric belt, a horizontal support element pivotally connected on the outer surface of each said bracket member to extend between a folded position parallel to said vertical outer surface and an unfolded support position extending perpendicular thereto for securement of various articles to be suspended and supported from said bracket member, a brace member pivotally connected on said outer surface to extend between a folded position parallel to said vertical outer surface and an unfolded support position to engage and brace said horizontal support element in its folded support position, each said bracket member being rigidly mounted on the generally vertical object when said belt is firmly secured in the encircled condition and the article secured to said connector means being suspended and supported by said bracket member.

7. The portable hanging system according to claim 6 including
leveling means on said bracket member for manually adjusting the angular position of said bracket member relative to the generally vertical object on which it is secured to level said horizontal support element.

8. The portable hanging system according to claim 6 in which
there are a pair of identical said bracket members, and
each said horizontal support element is configured to receive and support one end of a flat rectangular platform, whereby
each of said pair of bracket members are rigidly mounted on the generally vertical object in laterally spaced relation and in the unfolded support position each end of the platform is supported between said laterally spaced brackets in a generally horizontal position to serve as a shelf.

9. The portable hanging system according to claim 8 in which
each said horizontal support element comprises a generally rectangular member having a flat outer surface and a flat tang portion parallel thereto and spaced therefrom to define a slot to receive and engage one end of the flat rectangular platform, and
in the unfolded support position each end of the platform is installed between said horizontal support element flat outer surface and flat tang portion to be supported between said laterally spaced brackets in a generally horizontal position to serve as a shelf.

10. The portable hanging system according to claim 6 including
second connector means at the outer end of said horizontal support element for securement of various articles to be suspended and supported from said horizontal support element in its unfolded support position.

11. The portable hanging system according to claim 10 in which
said second connector means is an upwardly curved hook element on the outer end of said horizontal support element.

12. A compact portable hanging kit for campers and backpackers for supporting various articles from generally vertical objects of varying diameters comprising:
a non-elastic flexible fabric belt having and inner and outer surface and of sufficient length to encircle an exterior surface of generally vertical objects of varying diameters and capable of being folded in a compact storage configuration,
a rigid loop member secured on one end of said belt,
an adjustable lever-type cam buckle member installed on said belt having a pivotal lever portion configured to grip said belt and to releasably engage said loop member and draw said loop member and the gripped portion of said belt toward one another to apply tension in the encircled portion of said belt and bias said lever portion in a fastened condition to firmly secure said belt in the encircled condition and capable of being folded therewith in the compact storage configuration, and
a plurality of bracket members each having a generally vertical flat tang portion to be slidably and removably received between the exterior surface of the generally vertical object and the inner surface of said belt by vertical insertion or removal when said belt is in an encircled unfastened condition and each said bracket member having an outer surface disposed on the outer surface of said belt when installed thereon, connector means formed on the outer surface of each said bracket member configured to receive various articles to be suspended and supported from said bracket member,
each said bracket member tang portion being tightly gripped and rigidly secured between the exterior surface of the generally vertical object and the inner surface of said belt to prevent relative movement therebetween when said belt is firmly secured in the encircled and fastened condition, and the article received thereon being suspended and supported by said bracket member, and
said bracket members having a length to approximately correspond to the length of the folded belt and adjustable fastener in the compact storage condition whereby said belt, said buckle, and said plurality of brackets may be stored in a small space and easily transported.

* * * * *